(12) United States Patent
Inazumi

(10) Patent No.: US 7,616,212 B2
(45) Date of Patent: Nov. 10, 2009

(54) DATA CONVERSION METHOD FOR PROCESSOR, TEXTURE PRODUCING METHOD, PROGRAM, RECORDING MEDIUM, AND PROJECTOR

(75) Inventor: Mitsuhiro Inazumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 432 days.

(21) Appl. No.: 11/672,564

(22) Filed: Feb. 8, 2007

(65) Prior Publication Data
US 2007/0200865 A1  Aug. 30, 2007

(30) Foreign Application Priority Data
Feb. 27, 2006 (JP) .............................. 2006-049734

(51) Int. Cl.
G09G 5/00 (2006.01)
(52) U.S. Cl. ..................................................... 345/582
(58) Field of Classification Search ........................ None
See application file for complete search history.

(56) References Cited

U.S. PATENT DOCUMENTS 6,862,012 B1 * 3/2005 Funakoshi et al. ............ 345/88
6,995,767 B1 * 2/2006 Donovan et al. ............ 345/428
2006/0164427 A1 * 7/2006 Cook et al. .................. 345/581

OTHER PUBLICATIONS

Jeremy Selan; "Using Lookup Tables to Accelerate Color Transformations;" *GPU Gems 2; Programming Techniques for High-Performance Graphics and General-Purpose Computation*; 2005; pp. 381-392.

* cited by examiner

*Primary Examiner*—Aaron M Richer
(74) *Attorney, Agent, or Firm*—Oliff & Berridge, PLC

(57) ABSTRACT

In a data conversion method which refers to textures for converting an input value into an output value by using a predetermined function, the data conversion method includes: converting the input value into an unequal division value, producing a linearly approximated component of the unequal division value, producing an expansion coefficient corresponding to the unequal division value, producing a function value of a quadratic or larger degree component of a orthogonal function expressing the function for the interval containing the unequal division value, calculating the product of the produced expansion coefficient and the produced function value, and adding the obtained product to the produced linearly approximated component to obtain the output value.

5 Claims, 12 Drawing Sheets

DATA CONVERSION METHOD FOR PROCESSOR, TEXTURE PRODUCING METHOD, PROGRAM, RECORDING MEDIUM, AND PROJECTOR

BACKGROUND

1. Technical Field

The present invention relates to a data conversion method for a processor, a method for producing textures to which the processor refers by the data conversion method, a program under which a computer executes these methods, a recording medium, and projector.

2. Related Art

Image processing executed by a computer or other devices includes complicated procedures for data conversion. For example, image processing includes color conversion for converting inputted color representation such as YCbYr into RGB to be outputted, luminance and saturation conversion for fitting colors to be outputted to characteristics of an image display device and user's preference, and other processing. The image processing also involves non-linear data conversion.

Image processing of this type requires real time processing capability, and therefore ICs exclusively used for image processing have been equipped.

However, recent advances in semiconductor technology have made it possible to execute real time image processing by using high-speed, general-purpose and programmable ICs such as a GPU (graphics processing unit).

In image processing by the exclusively used ICs and the general-purpose GPUs discussed above, data conversion using table reference is often adopted so that complicated data conversion can be performed at high speed.

For example, conversion from a certain value X into another value Y is expressed by using a function F as Y=F(X). For simplifying explanation, it is assumed herein that one input corresponds to one output. In reality, however, it is possible that multiple inputs correspond to multiple outputs.

When the function F is expressed in a simple form, the function calculation can be directly executed. However, when the function F has an extremely complicated form, processing speed decreases if the function calculation is executed on each occasion. In addition, it is impossible to apply the function F directly to hardware due to its circuit scale.

In this case, an efficient method to be used is as follows. Assuming that only discrete N inputs are given, a set of N conversion values obtained by the function F each of which is associated with the corresponding one of the N inputs are prepared in the form of table. Then, the process for obtaining the F(X) is replaced with the process for obtaining approximate values by interpolation between values for reading and values actually read from the table.

The method for selecting N discrete inputs used for preparing the table involves equal division and unequal division.

The equal division method divides a possible input range into equal intervals as it is called, and obtains values of the function F corresponding to the respective intervals.

According to this method, both reference to the table and interpolation are easy. However, the range needs to be divided into small intervals so as to increase approximation accuracy in an area of more complicated changes of the function F. It is therefore possible that the produced table becomes redundant on the whole since a number of divisions are included.

The unequal division method solves this problem. The unequal division method divides an area of complicated changes of the function F into small intervals and divides an area of simple changes into large intervals so that a highly accurate table having a small division number can be produced.

However, some consideration is needed to determine the positions in the table corresponding to the given inputs. In addition, more complicated processes are required for interpolation.

When image processing is performed by an exclusively provided IC, these problems arising from the unequal division method are not major obstacles. However, some consideration is needed when a general-purpose GPU having only a reference function for the equal division method is used.

A table readout function in the GPU gives a table as image data called texture constituted by a finite number of pixels disposed at equal intervals, and reads the data by using serial values called texture coordinates.

For reading data corresponding to texture coordinates between the pixels, an interpolation value is produced by way of hardware using pixel values near the texture coordinates.

More specifically, for obtaining a conversion value corresponding to an input value, an interpolation value is automatically produced by way of hardware based on a value given discretely according to equal divisions in the table. In most cases, the reading method is selected from two types: reading method using the nearest data value (NEAREST reading); and reading method using linear interpolation based on a plurality of near data values (LINEAR reading).

A method for referring to the table for unequal division by using this function of the general-purpose GPU has been proposed (for example, see *GPU Gems* 2, written by Jeremy Selan, compiled by Mate Pharrr published by Addison-Wesley, pp. 381-392, 2005). According to this method, a texture in the form of a table is not directly read by using texture coordinates. Initially, conversion of a texture for converting texture coordinates is executed, and thereafter the texture is indirectly read based on the conversion value.

According to the method disclosed in the above reference, however, it is necessary to select either the NEAREST reading or the LINEAR reading for the interpolation in each interval of the unequal division when the genera-purpose GPU is used. Thus, error is produced in this case.

The only way for reducing the error is to increase the number of division, that is, increase data volume.

SUMMARY

It is an advantage of some aspects of the invention to provide a data conversion method for a processor capable of performing highly accurate data conversion without increasing data volume, a texture producing method, a program, a recording medium, and a projector.

A data conversion method for a processor according to an aspect of the invention is a data conversion method which refers to textures for converting an input value inputted to the processor into an output value by using a predetermined function. The processor executes: a first texture referring step for referring to a first texture and converting the input value into an unequal division value, the first texture being produced by dividing an input range by M pieces of data into (M-1) equal intervals and an output range by N pieces data into (N-1) equal intervals, where N: is smaller than M, selecting N pieces of data in unequal division from the M pieces of data in the input range, and establishing correspondences between the selected N pieces of data and the N pieces of data in the output range; a second texture referring step for referring to a second texture and producing a linearly approximated component of the unequal division value, the second texture being produced by interpolating function values for each of the (N−1) intervals using zero degree and linear components of an orthogonal function expressing the function; a third texture referring step for referring to a third texture and producing an expansion coefficient corresponding to the unequal division value, the third texture being produced by interpolating texture groups having expansion coefficients of quadratic or larger degree components of the orthogonal function in each of the (N-4) intervals; a function value producing step for producing a function value or a quadratic or larger degree component of the orthogonal function for the interval containing the unequal division value; and an adding step for calculating the product of the expansion coefficient produced by the third texture referring step and the function value produced by the function value producing step, and adding the obtained product to the linearly approximated component produced by the second texture referring step to obtain the output value.

The function used for obtaining the ultimate function values by referring to the first through third textures is not limited to a one-dimensional function but may be a multi-dimensional function.

The orthogonal function expressing the function to be obtained may be a multi-dimensional variable function. For example, one-dimensional variable functions such as Fourier transform and conversion by Legendre polynomial and two-dimensional variable functions such as discrete cosine transform can be used.

As discussed above, the general-purpose GPU selects either NEAREST reading or LINEAR reading. It is preferable that NEAREST reading is employed for the reference of the third texture.

In the function value generation step, the function values may be calculated and produced directly from the quadratic or larger degree components of the orthogonal function. Alternatively, the function values may be produced by LINEAR reading or NEAREST reading with reference to the fourth texture storing the function values of the orthogonal function in the respective texture groups.

According to this aspect of the invention, the first texture referring step initially executes data reference by the unequal division method by using the general-purpose GPU or other devices which can perform data reference only by the equal division method. Thus, interval allocation can be most efficiently established for the function to be obtained by the unequal division method. As a result, the efficiency of calculation performed by the processor can be increased, and error from the function to be obtained can be reduced without increasing the volume of data.

Then, the second texture referring step produces linear approximate components interpolated by zero degree and linear components of the orthogonal function which approximates the function to be obtained, and the third texture referring step and the function value producing step interpolate the error between the function value calculated by the function to be obtained and the unction value calculated by the linear approximate components. As a result, the necessity for enlarging data volume by increasing the number of intervals produced by equal division as needed in the above identified reference is eliminated, and error from the function value obtained through conversion of the input value by the function to be obtained can be reduced.

In the multi-step structure which refers to the plural textures, therefore, input values can be converted into highly accurate outputs at high speed in accordance with the original function to be obtained even when the general-purpose GPU is used.

According to this aspect of the invention, it is preferable that the orthogonal function is Legendre polynomial.

The Legendre polynomial is an orthogonal function given by the following equation (1). The accuracy increases as the degree n in the equation (1) increases. However, a cubic equation or equivalence is preferable for the equation (1).

$$P_n(x) = \begin{cases} \frac{1}{2^n n!} \cdot \left(\frac{d}{dx}\right) \cdot (x^2 - 1)^n & (n \geq 1) \\ 1 & (n = 0) \end{cases} \quad (1)$$

In this case, the output value Y for the input value X can be obtained by the simple orthogonal function shown in the equation (1). Thus, the structure of the first through third textures can be simplified, and the calculation speed of the processor can be increased.

Particularly, this method is appropriate for image processing which applies γ correction and conversion of non-uniform luminance and color to input image signals to produce output image signals.

A texture producing method according to another aspect of the invention is a texture producing method for producing textures to which a processor refers for converting an input value into an output value by using a predetermined function. The texture producing method includes: a first texture producing step for producing a first texture by dividing an input range by M pieces of data into (M-1) equal intervals and an output range by N pieces of data into (N−1) equal intervals, where N is smaller than M, selecting N pieces of data from the M pieces of data which divide the input range into the respective intervals, and establishing correspondences between the N pieces of data selected in the input range and the N pieces of data in the output range; an orthogonal function expanding step for expanding each of the (N-1) intervals by using an orthogonal function expressing the function; an interpolation texture calculating step for interpolating each of the (N-1) intervals by using zero and linear components in the orthogonal function and calculates an interpolation texture; a boundary value calculating step for calculating boundary values of an adjoining pair of the intervals in the boundary area therebetween in the interpolation texture; a threshold value judging step for judging whether the difference between the boundary values of the adjoining pair of the intervals in the boundary area therebetween is smaller than a predetermined threshold value based on the calculated boundary values; a restarting step for repeating processes from the first texture producing step when it is judged that the difference is a predetermined threshold value or larger; a boundary average calculating step for calculating the average of the boundary values of the adjoining pair of the intervals in the boundary area therebetween when it is judged that the difference is smaller than the predetermined threshold value; a second texture producing step for producing a second texture by substituting the average calculated by the boundary average calculating step for the boundary values of the respective intervals in the interpolation texture; a third texture producing step for producing a third texture by establishing the correspondences between the respective intervals in the interpolation texture and quadratic and larger degree expansion coefficients in the orthogonal function; and a fourth texture producing step for producing a fourth texture by establishing the correspondences between the respective intervals in the interpolation texture and function values of quadratic and larger degree components in the orthogonal function.

According to this aspect of the invention, as can be understood from the above description, data conversion by the processor using the textures can be executed with high accuracy at high speed in accordance with the function to be obtained by reference to the respective textures produced.

When the boundary values of an adjoining pair of the intervals in the boundary area therebetween are different from each other in the interpolation texture initially obtained, the restarting step repeats the boundary value calculating step from the first texture producing step. When it is determined that the difference is equal to or smaller than the predetermined threshold value, the boundary value is determined as the average of the boundary values in, the boundary area. Thus, the continuation of the interpolated function values obtained for the respective intervals can be secured, and these function values can be handled by the processor such as a GPU.

According to further aspects of the invention, the invention is applicable not only to the data conversion method for a processor discussed above, but also to a program under which a computer executes the respective steps constituting the data conversion method and a recording medium to be read by a computer on which medium the program is recorded. These aspects of the invention can offer advantages similar to those shown above.

A projector according to a still further aspect of the invention includes: a light modulation element for modulating lights emitted from a light source in accordance with image information; a projection optical system for enlarging and projecting the lights modulated by the light modulation element; and an image processing device for processing the image information. The image processing device has a processor and a storing device. The storing device has (1) a first texture produced by dividing an input range by M pieces of data into (M−1) equal intervals and an output range by N pieces data into (N−1) equal intervals, where N is smaller than M, selecting N pieces of data in unequal division from the M pieces of data in the input range, and establishing correspondences between the selected N pieces of data and the N pieces of data in the output range, (2) a second texture produced by interpolating the function value for each of the intervals in the output range of the first texture using zero degree and linear components of an orthogonal function which approximates the function, and (3) a third texture produced by interpolating texture groups having expansion coefficients of quadratic or larger degree components of the orthogonal function in each of the intervals in the output range of the first texture.

In this case, the inputted image signals can be converted with high accuracy at high speed by operations similar to those shown above. Thus, projection images converted into images having reduced γ correction and non-uniformity of color and luminance can be displayed at high speed.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Exemplary embodiments according to the invention are hereinafter described.

First Embodiment

Figure 1:
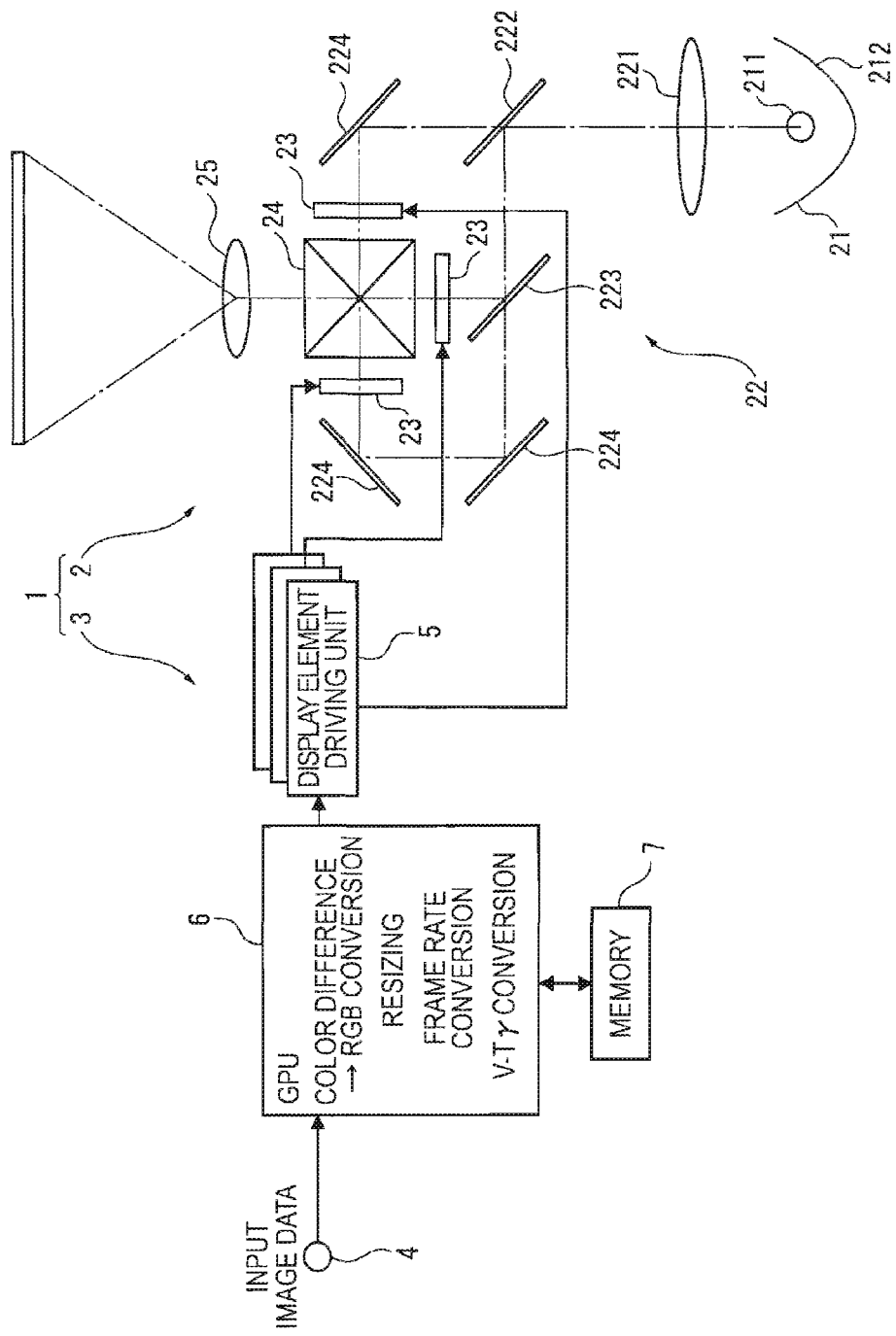
FIG. 1 schematically illustrates a structure of a projector in a first embodiment according to the invention.

FIG. 1 shows a projector 1 as a projection-type display apparatus in a first embodiment according to the invention. The projector 1 includes an optical device 2 and an image processing device 3.

1. Structure of Optical Device 2

The optical device 2 has a light source lamp 21, an optical unit 22 having a condensing lens, a mirror and other components, three liquid crystal panels 23 as light modulation elements, a color synthesizing optical device 24 such as a cross dichroic prism, and a projection lens 25. Lights emitted from the light source lamp 21 reach the optical unit 22, where the in-plane luminance distribution of the released lights is equalized and color separation into three colors of R, G and B is executed. Then, the respective colors are supplied to the corresponding liquid crystal panels 23, and modulated by the liquid crystal panels 23 in accordance with input image data. Thereafter, the respective colors are synthesized by the color synthesizing optical device 24, and the synthesized lights are enlarged and projected on a screen SC by the projection lens 25.

The light source lamp 21 has a discharge light emission pipe 211 such as an extra-high pressure mercury lamp and a reflector 212. Lights emitted from the discharge light emission pipe 211 are directed such that all the lights have the same direction by the reflector 212, and then are released.

The optical unit 22 has an illumination optical element 221, dichroic mirrors 222 and 223, and mirrors 224.

The illumination optical element 221 equalizes the in-plane luminance distribution of lights emitted from the light source lamp 21, and superposes the lights on image forming areas of the liquid crystal panels 23 as areas to be illuminated. The illumination optical element 221 has a multi-lens array constituted by a plurality of small lenses arranged in a plane and in matrix and dividing illumination lights coming from the light source lamp 21 into a plurality of partial lights, a condensing lens for condensing the partial lights divided by the multi-lens array and superposing the condensed lights on the image forming areas of the liquid crystal panels 23, and other components.

The dichroic mirrors 222 and 223 are color separation optical devices for separating the lights emitted from the light source lamp 21 into respective colors of R, G and B. For example, the dichroic mirror 222 disposed upstream in the optical path transmits red light and reflects the other colors, and the dichroic mirror 223 disposed downstream in the optical path reflects green light and transmits blue light. The mirrors 224 bend the respective lights separated by the dichroic mirrors 222 and 223, and supplies the bent lights to the image forming areas of the liquid crystal panels 23. Generally, a relay optical system constituted by lenses and other components are equipped downstream from the dichroic mirror 223 though not shown in the figure. This relay optical system is provided because the optical path length in the ft half in FIG. 1 is longer than the optical path length in the other part.

The three liquid crystal panels 23 are optical devices for modulating the respective lights separated by the dichroic mirrors 222 and 223 based on the image information.

The respective liquid crystal panels 23 are formed as fixed pixel type image forming devices, and constituted by a plurality of fixed pixels disposed in a plane in the image forming areas. The fixed pixels, though not; shown in the figure, have TFTs (thin filmed transistors) as switching elements for applying voltage to liquid crystals sealed between a pair of transparent substrates. The voltage applied to the respective pixels varies by the switching operation of the TFTs, and accordingly the orientation of the liquid crystals changes. By this method, the entering lights can be modulated in accordance with the input image data.

The color synthesizing optical device 24 is an optical device having wavelength selection films substantially X-shaped in the plan view. The lights modulated by the respective liquid crystal panels 23 are synthesized by the color synthesizing optical device 24 to be a color image.

The projection lens 25 is an optical component for enlarging and projecting the modulated lights modulated by the liquid crystal panels 23 onto the screen SC. The projection lens 25 is constituted by plural sets of lenses contained in a lens barrel.

2. Structure of Image Processing Device 3

The image processing device 3 applies image processing to input image data inputted from an image signal input pin 4, and operates the liquid crystal panels 23 by using a display element driving unit 5 based on the results of the image processing so that an appropriate image can be formed in accordance with the input image data.

The image processing device 3 is constituted by a GPU (graphic processing unit) 6 packaged on a main board contained in the projector 1, and a memory 7.

The GPU 6 executes processes such as conversion from color difference data into RGB data, display size conversion, frame rate conversion, and V-Tγ conversion for input image data (input value) inputted from the image signal input pin 4 so as to form an appropriate image on the liquid crystal panels 23 in accordance with the input value.

The GPU 6 is provided as a general-purpose graphic processor, and refers to textures in the form of a table stored in the memory 7 for performing various types of conversions. In readout, the GPU 6 can execute NEAREST reading for reading data on a texture having the coordinates closest to the input coordinates, and LINEAR reading for conducting linear conversion by using values near the input coordinates.

The memory 7 stores various software executed by the GPU 6, and textures used when the GPU 6 reads output values corresponding to input values.

2-1. Structure of Functional Means in GPU 6

Figure 2:
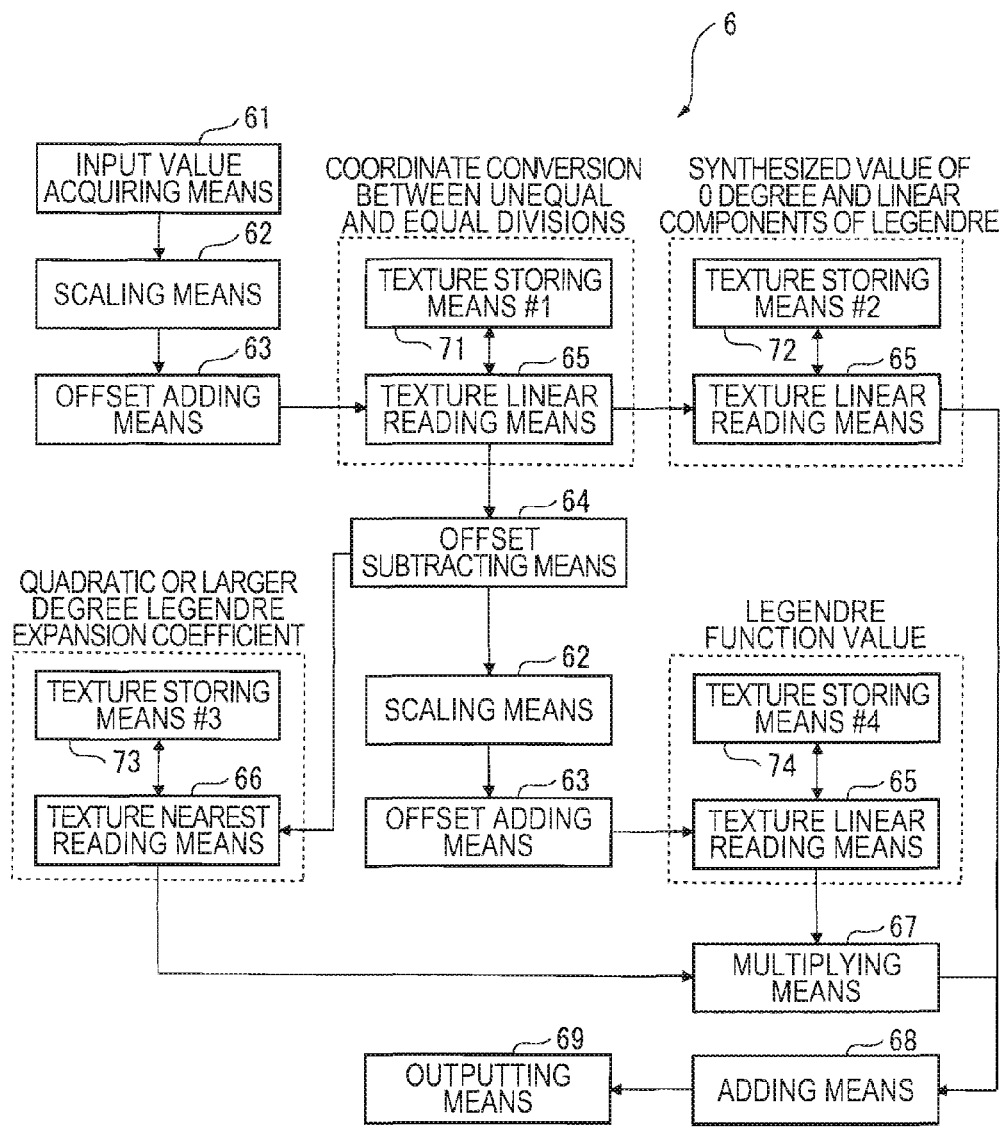
FIG. 2 is a block diagram showing a structure of a GPU contained in the projector in the first embodiment.

As illustrated in FIG. 2, the GPU 6 has input value acquiring means 61, scaling means 62, offset adding means 63, offset subtracting means 64, texture LINEAR reading means 65, texture NEAREST reading means 66, multiplying means 67, adding means 68, and outputting means 69, all of which are programs to be executed.

The memory 7 has first texture storing means 71, second texture storing means 72, third texture storing means 73, and fourth texture storing means 74, to all of which the GPU 6 refers, and all of which are secured in a part of the storage area of the memory 7.

The input value acquiring means 61 acquires an input value as input image data inputted from the image signal input pin 4. The input value contains image data such as color difference and luminance in accordance with pixels in the display frame.

The scaling means 62 executes scaling when data in a certain input range is inputted, and outputs the enlarged or contracted result of this range.

The offset adding means 63 adds a predetermined offset value to the input data when the data is inputted, and outputs the result.

The offset subtracting means 64 subtracts a predetermined offset value from the input data when the data is inputted, and outputs the result.

The texture LINEAR reading means 65 refers to a texture stored in the memory 7 by using coordinates of data when the data is inputted, reads nearby data before and behind the input coordinates, and outputs the result obtained after linear interpolation.

The texture NEAREST reading means 66 refers to a texture stored in the memory 7 by using coordinates of data when the data is inputted, reads data nearest to the input coordinates, and outputs the result.

The multiplying means 67 calculates the product of respective data when two types of data is inputted, and outputs the result.

The adding means 68 calculates the sum of respective data when two types of data is inputted, and outputs the result.

The outputting means 69 outputs the final calculation result obtained after processes executed by the respective means.

2-2. Structure of First Texture Storing Means 71

The first texture storing means 71 stores data used for handling input values by the unequal division method by using the GPU 6 which generally handles input values only by the equal division method.

Figure 3:
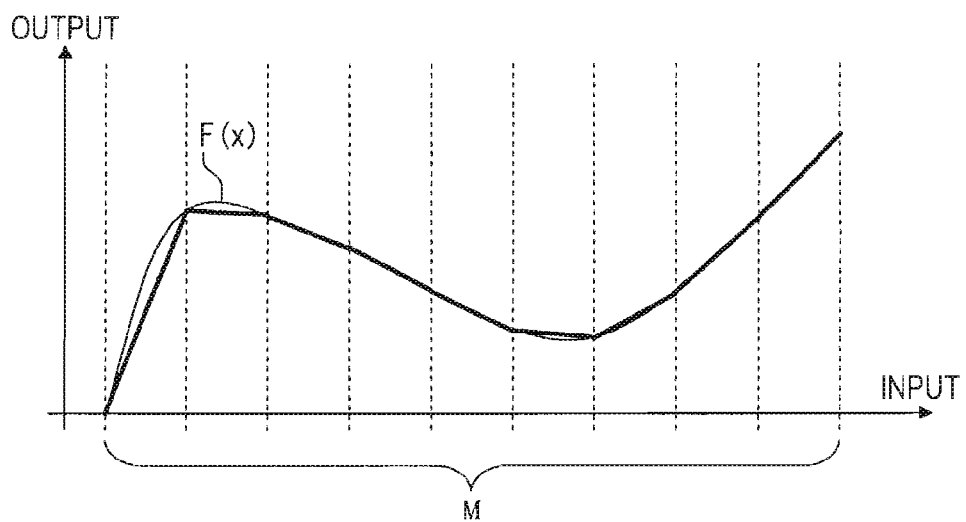
FIG. 3 is a graph showing a structure of a first texture in the first embodiment.

Generally, as illustrated in FIG. 3, the GPU 6 interpolates a function F(X) by equally dividing a range of the function F(X) by M pixels and performing linear approximation in each of (M−1) intervals between the pixels. Thus, the number M of the pixels needs to be a sufficient number if the accuracy of an interpolation value produced for an input value is desired to be increased.

Figure 4:
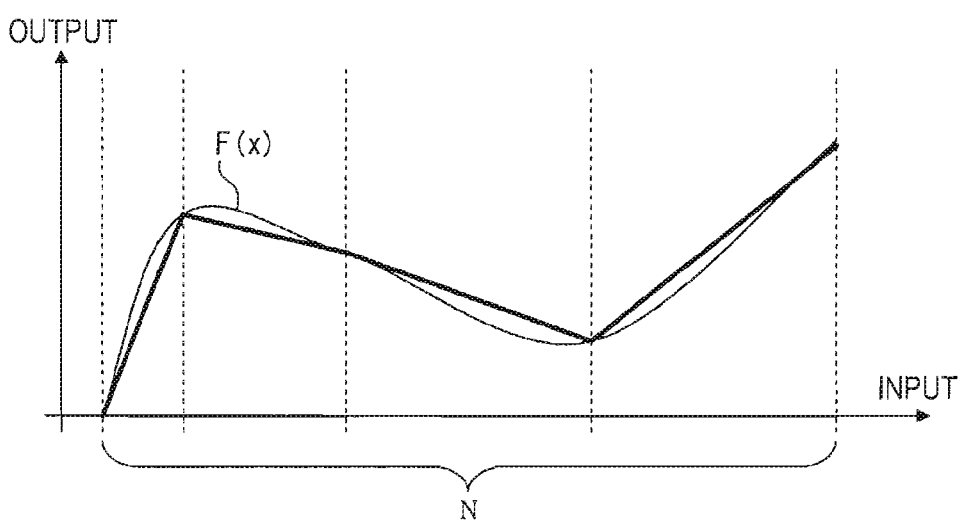
FIG. 4 is a graph showing a structure of the first texture in the first embodiment.

On the other hand, in interpolation of a function F(X) by the unequal division method, the interval width is small for sharp curves and large for smooth curves in the function F(X) as illustrated in FIG. 4. The range of the function F(X) is divided by N pixels fewer than M pixels used in the equal division, and linear approximation is executed in each of (N−1) intervals. Thus, highly accurate interpolation values can be obtained by using considerably fewer data than the data used in the equal division.

Figure 5:
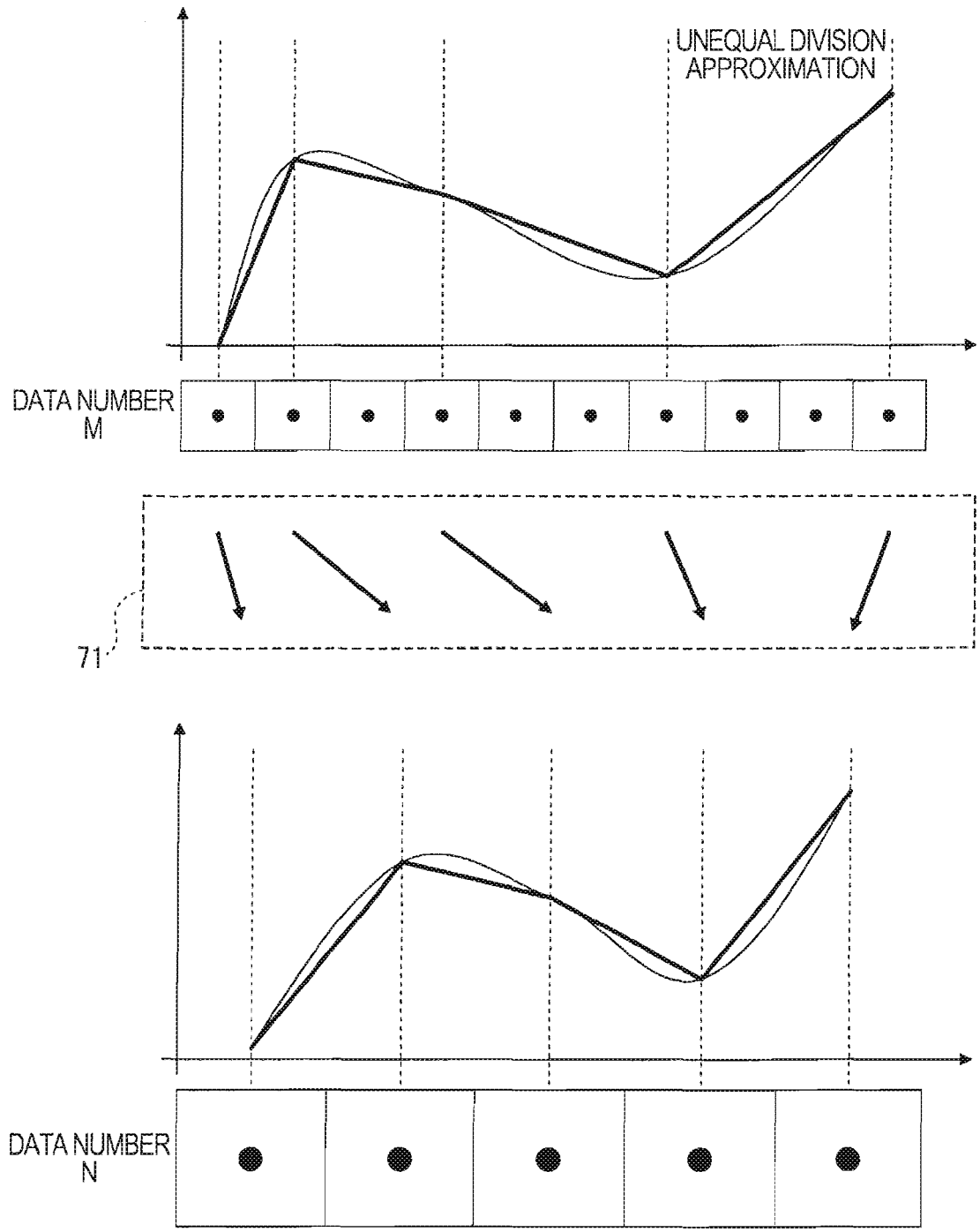
FIG. 5 is a graph showing a structure of the first texture in the first embodiment.

Turning now to FIG. 5, N pixels in the unequal division are selected from the input range equally divided by M pixels, and are allocated to the output range equally divided by N pixels. By this method, the general-purpose GPU 6 can execute the unequal division method.

Figure 6:
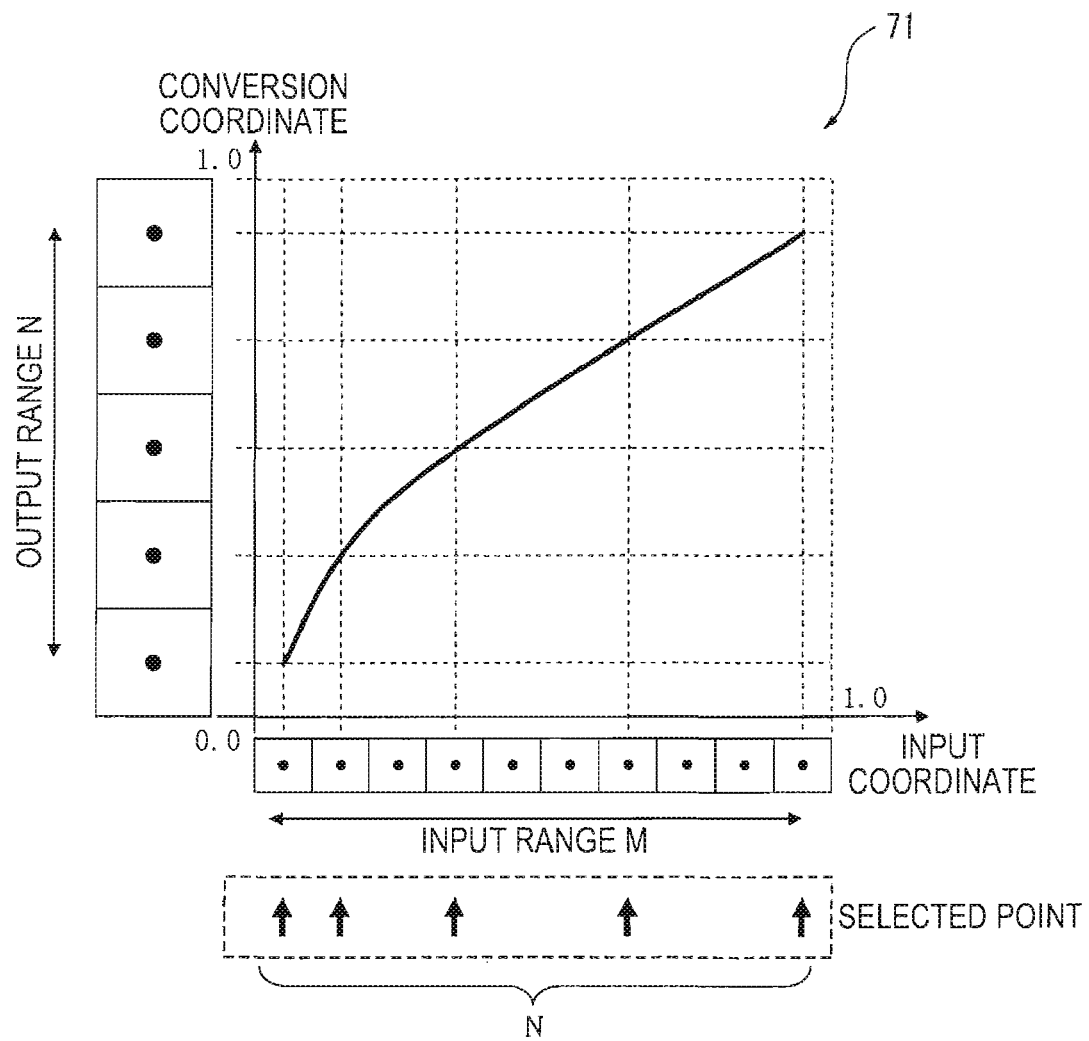
FIG. 6 is a graph showing a structure of the first texture in the first embodiment.

Thus, the first texture storing means 71 stores a table used for allocating N pixels selected from M pixels to the output range equally divided by N pixels. More specifically, as illustrated in FIG. 6, the first texture storing means 71 stores a table which determines correspondence between the input range equally divided by M pixels and the output range equally divided by N pixels. This table gives correlations between N pixels in the unequal division selected from M pixels in the input range, which N pixels are used for approximating the function F(X) to be obtained, and N pixels in the output range.

The texture LINEAR reading means 65 of the GPU 6 refers to the first texture storing means 71 and outputs an output value Y as an unequal division value when an input value X is inputted.

2-3. Structures of Second Texture Storing Means 72, Third Texture Storing Means 73, and Fourth Texture Storing Means 74

When the output value for the input value is obtained by the function F(X), the output value is converted by expansion using Legendre polynomial as an orthogonal function expressed as the following equation (2). Thus, the function F(X) is converted into the linear sum by Legendre polynomial. The approximation accuracy increases as the degree n in the equation (2) increases. However, when the load given to the calculation by the GPU 6 and high-speed conversion are taken into account, a cubic equation or equivalence is sufficient as the equation (2).

This corresponds to the fact that a complicated curve connecting a plurality of points is approximated by a cubic spline curve with high accuracy. The cubic spline curve can be represented by a cubic or lower degree Legendre function without producing error.

The second texture storing means 72, the third texture storing means 73, and the fourth texture storing means 74 store data associated with the respective terms in the Legendre polynomial. The data stored in the respective texture storing means is now explained in detail.

$$P_n(x) = \begin{cases} \frac{1}{2^n n!} \cdot \left(\frac{d}{dx}\right) \cdot (x^2-1)^n & (n \geq 1) \\ 1 & (n = 0) \end{cases} \quad (2)$$

Figure 7:
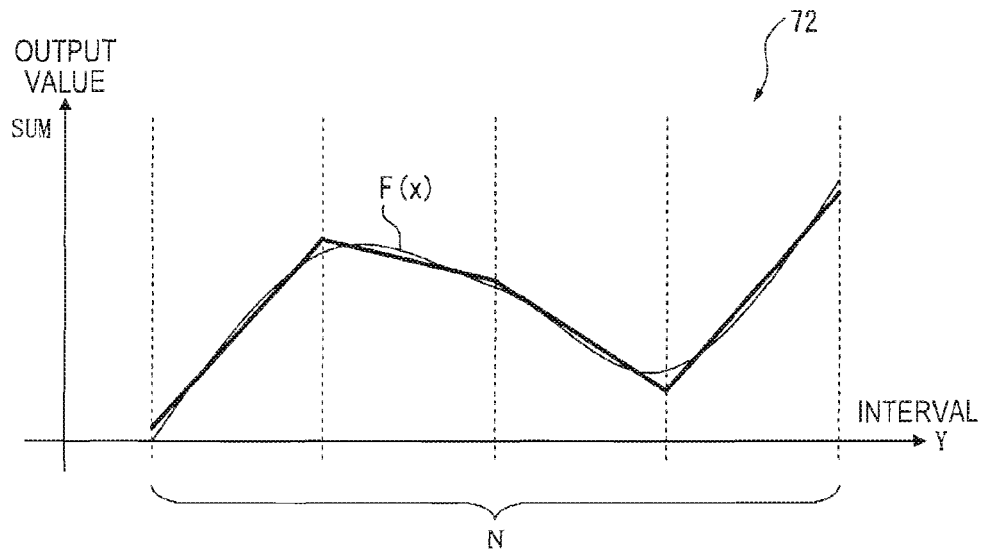
FIG. 7 is a graph showing a structure of a second texture in the first embodiment.

As illustrated in FIG. 7, the second texture storing means 72 stores interpolation values obtained by interpolating the function F(X) using zero degree and linear components of the equation (2) in each of the (N−1) intervals obtained by equal division by N pixels after conversion by the first texture storing means 71. The interpolation value in each interval, corresponds to the coefficient of the linear component in the equation (2). When the value Y outputted after referring to the first texture storing means 71 is inputted to the texture LINEAR reading means 65, the texture LINEAR reading means 65 selects the interval containing the input value Y from the (N−1) intervals, and outputs a value SUM calculated from the coefficient in the corresponding interval as an output value.

Figure 8:
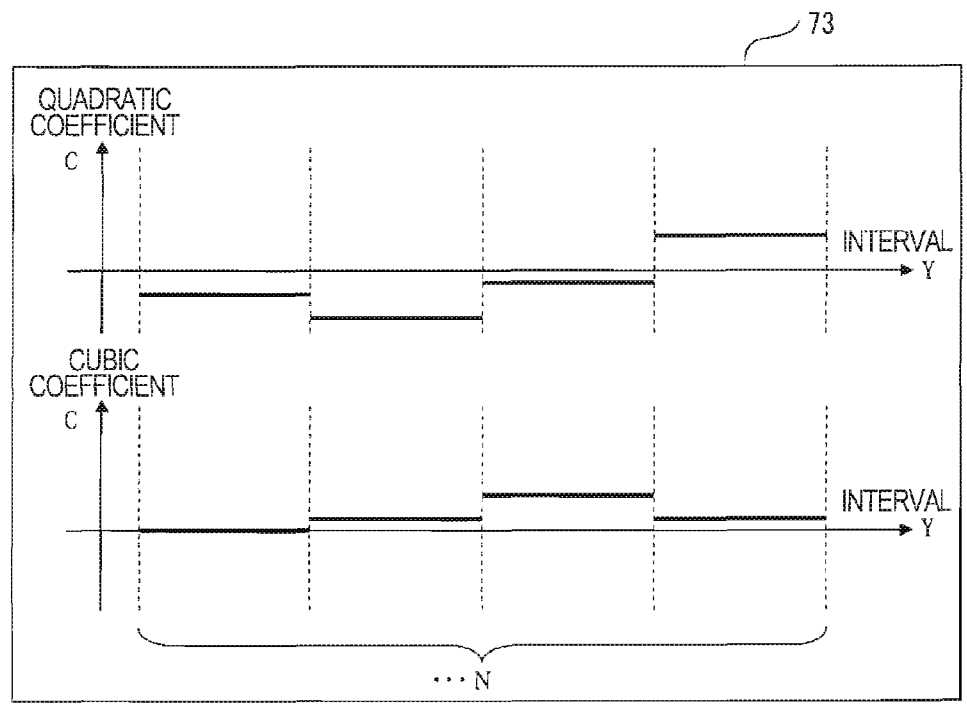
FIG. 8 is a graph showing a structure of a third texture in the first embodiment.

As illustrated in FIG. 8, the third texture storing means 74 stores extension coefficients of quadratic and larger degree components in the equation (2) for each of (N−1) intervals obtained through equal division by N pixels after conversion by the first texture storing means 71. More specifically, the third texture storing means 74 is constituted by texture groups which store coefficients for the respective intervals according to the degrees of the expansion terms, and the coefficients for the respective intervals are given as the nearest values.

When the value Y outputted after referring to the first texture storing means 71 is inputted to the texture NEAREST reading means 66, the texture NEAREST reading means 66 selects the interval containing the input value Y from the (N−1) intervals, and outputs the respective coefficients of the quadratic, cubic and up to n degree components in the Legendre polynomial for the selected interval as output values C.

Figure 9:
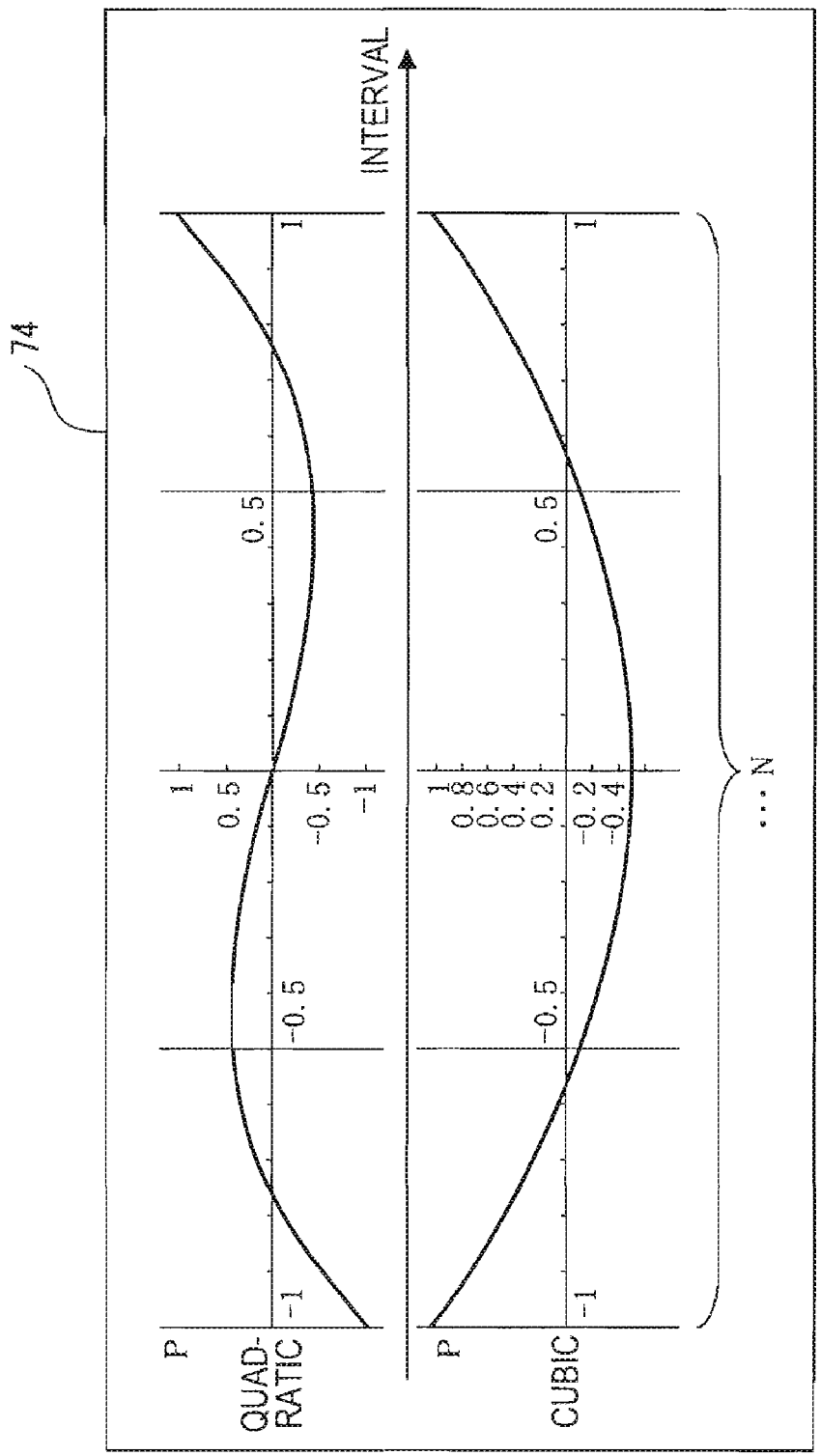
FIG. 9 is a graph showing a structure of a fourth texture in the first embodiment.

As illustrated in FIG. 9, the fourth texture storing means 74 stores function values obtained by enlarging the quadratic and cubit components of the Legendre polynomial for the (N−1) intervals produced by equal division by N pixels. More specifically, the fourth texture storing means 74 stores coefficients obtained by linearly interpolating the quadratic and cubit components for each interval.

Figure 10:
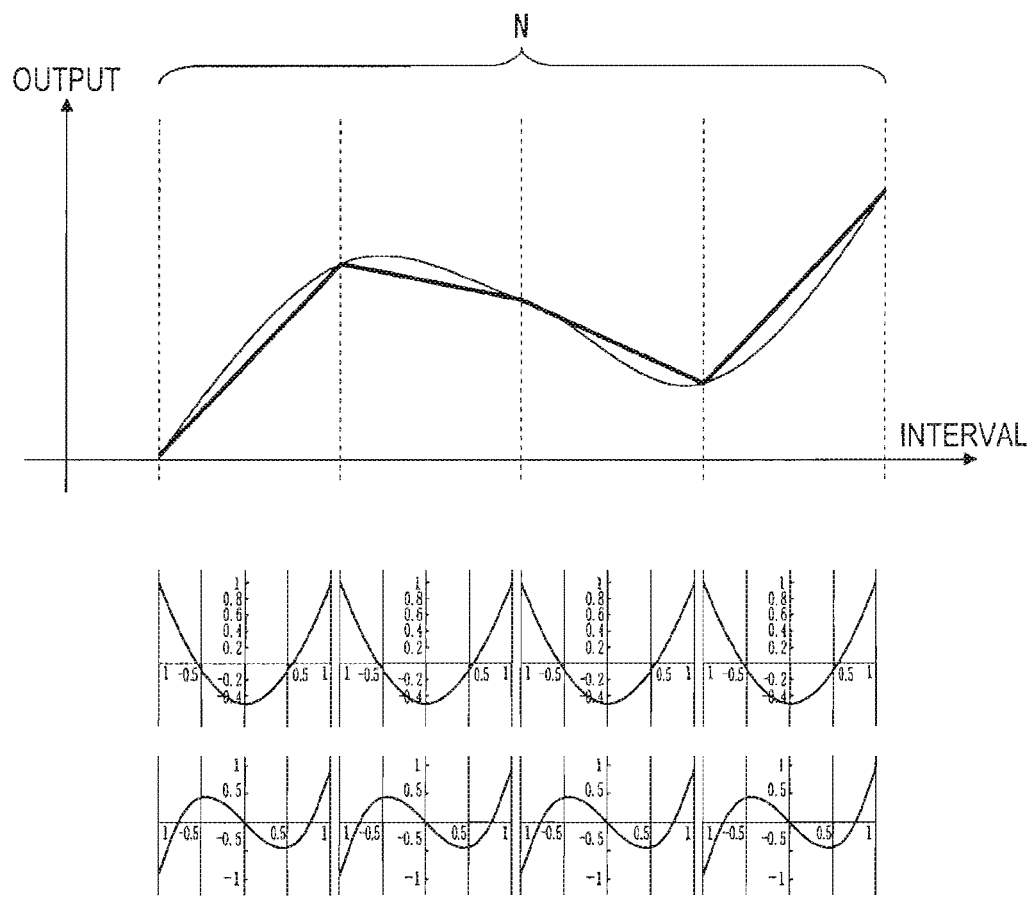
FIG. 10 is a graph showing a structure of the fourth texture in the first embodiment.

Peahen the value Y outputted after referring to the first texture storing means 71 is inputted to the texture LINEAR reading means 65, the texture LINEAR reading means 65 selects the interval containing the input value Y from the (N−1) intervals as illustrated in FIG. 10. Then, the selected interval is divided into (M-1) intervals in the fourth texture storing means 74, and the interval containing the input value Y is selected. Thereafter, the function values of the quadratic; cubic and up to n degree components for the corresponding interval are obtained by linear interpolation, and the function values of the respective components are outputted as output values P.

As discussed above, the quadratic and larger degree components in the Legendre polynomial are divided into (N−1) intervals and read by LINEAR reading in the fourth texture storing means 74. As a result, an interval of the (N−1) intervals produced by referring to the first texture storing means 71 is further divided into (N−1) intervals, and therefor error from the function F(X) can be further reduced.

3. Operation of Image Processing Device 3

Figure 11:
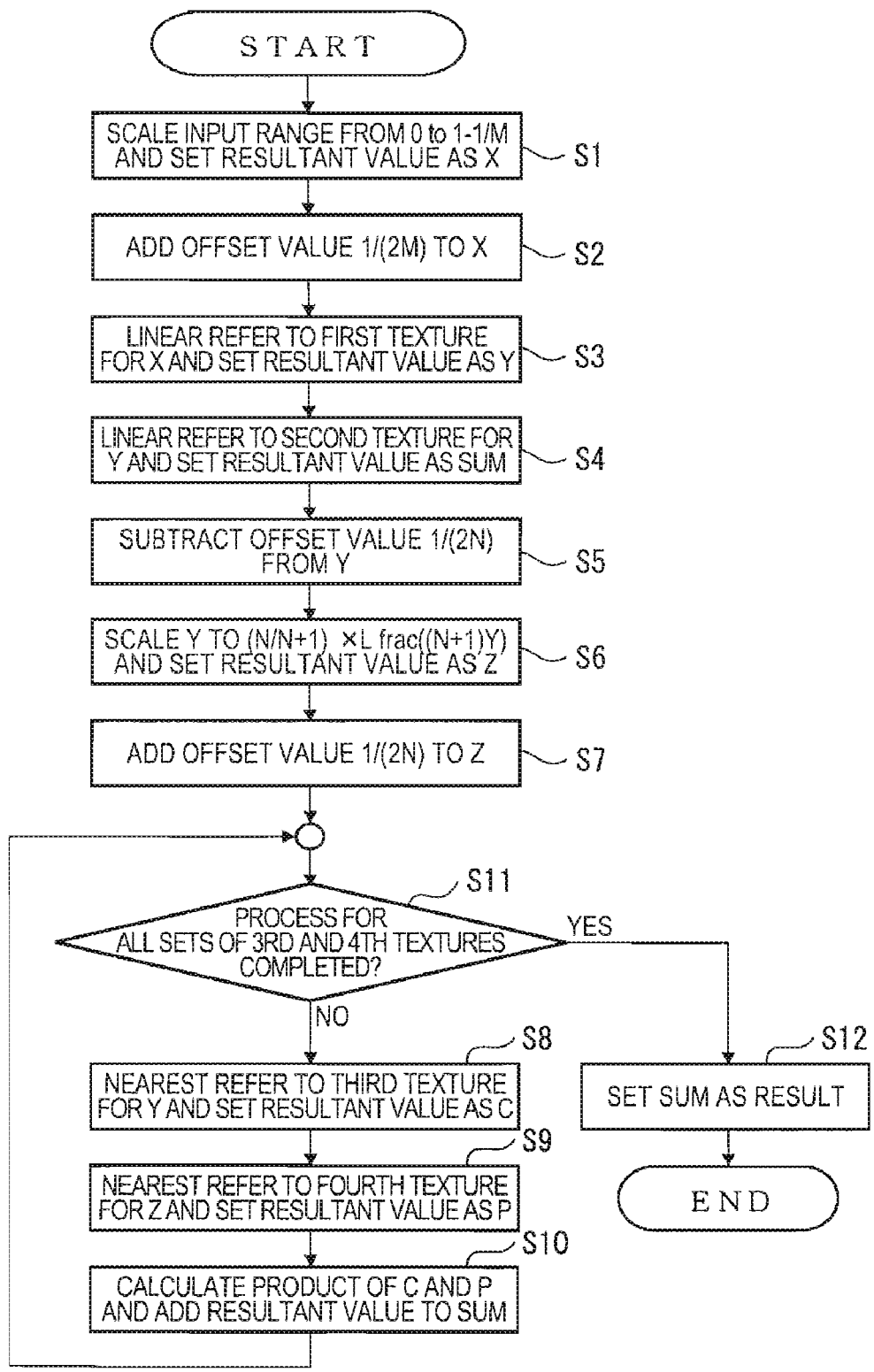
FIG. 11 is a flowchart showing an operation in the first embodiment.

Next, the operation of the image processing device 3 included in the projector 1 is described with reference to a flowchart shown in FIG. 11. In the following description, the input range is set from 0 to 1 for simplifying the explanation.

When image data such as RGB signals is inputted to the GPU 6 via the image signal input pin 4, the image data is acquired by the input value acquiring means 6.1. Then, the scaling means 62 scales the input range from 0 to 1−1/M and sets the obtained value as an input value X (step S1).

The offset adding means 63 adds an offset value 1/(2M) to the input value X (step S2).

The texture LINEAR reading means 65 reads the texture stored in the first texture storing means 71 by LINEAR reading for the input value X to which the offset value has been added, and converts the input value X in (N−1) intervals produced by equal division into an unequal division value Y in (N−1) intervals produced by equal division (step 53).

Subsequently, the texture LINEAR reading means 65 reads a texture stored in the second texture storing means 72 by LINEAR reading for the unequal division value Y as an input value, and stores the obtained value in the internal memory as a value SUM (step S4).

The offset subtracting means 64 subtracts an offset value 1/(2N) from the unequal division value Y step S5).

The scaling means 62 scales the unequal division value Y to (N/N+1)*frac (N+1), and outputs the obtained value as a value Z (step S6). The process frac extracts the decimal fraction from the parenthesized value.

The offset adding means 63 adds an offset value 1/(2N) to the value Z (step S7).

Then, the texture NEAREST reading means 66 reads a texture stored in the third texture storing means 73 by NEAREST reading for the unequal division value Y to obtain a coefficient value C, and stores the coefficient value C in the internal memory (step S8).

The texture LINEAR reading means 65 reads a texture stored in the fourth texture storing means 74 by LINEAR reading for the value Z to obtain a function value P, and stores the function value P in the interval memory (step S9).

The multiplying means 67 calculates the product of the coefficient value C and the function value P stored in the internal memory. The adding means 68 adds the product to the value SUM (step S10).

The steps from S8 to S10 are repeated for all sets of the textures (step S11). When this process is completed for all the sets, the outputting means 69 outputs the value SUM as the output value (step S12).

4. First through Fourth Texture Producing Method

Figure 12:
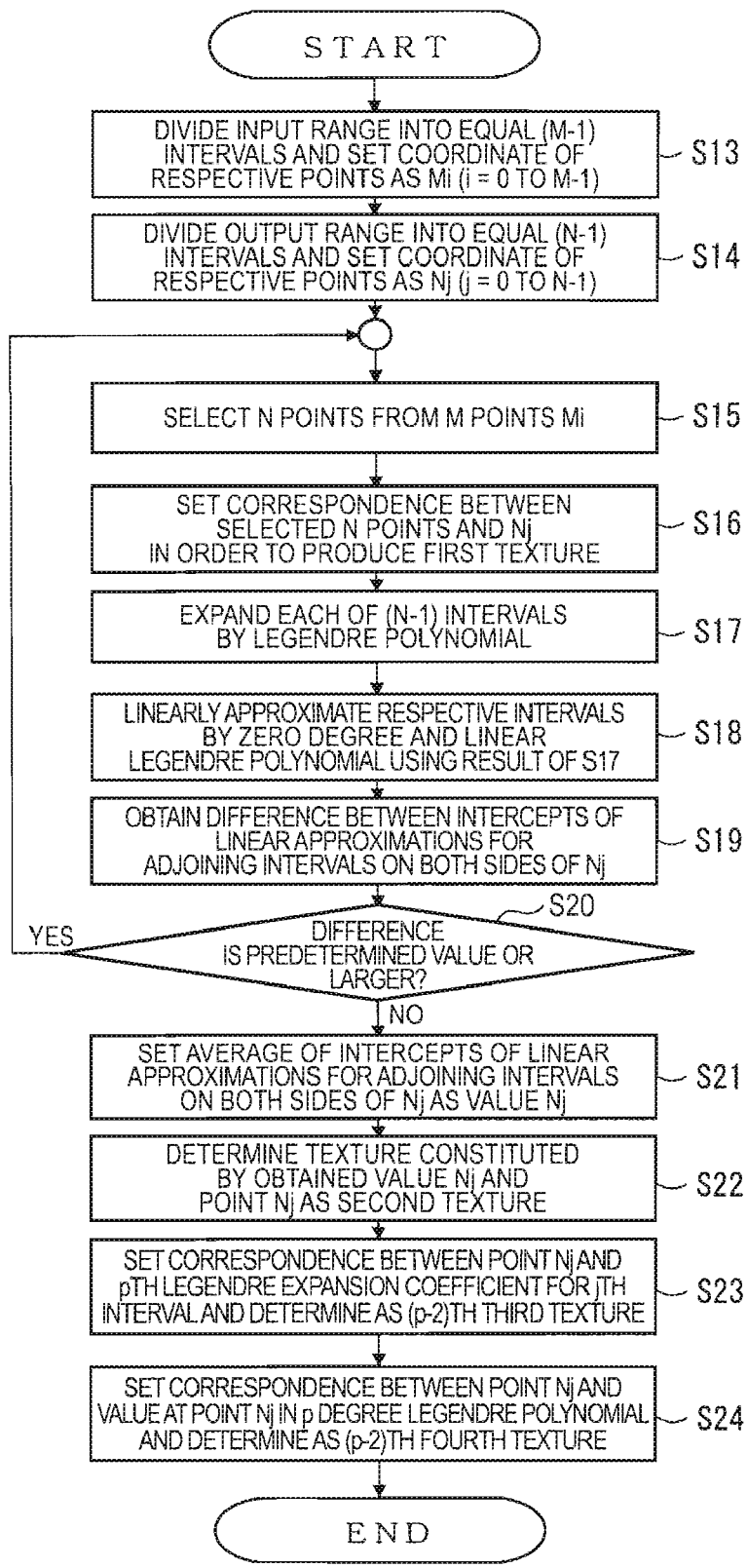
FIG. 12 is a flowchart showing steps for producing textures in the first embodiment.

Next, the method for producing the respective textures stored in the first texture storing means 71, the second texture storing means 72, the third texture storing means 73, and the fourth texture storing means 74 is discussed with reference to a flowchart shown in FIG. 12.

Initially, an input range is equally divided into (M−1) intervals, and the coordinates of the respective points are set as Mi (i=0 through M−1) (step S13).

An output range is equally divided into (N−1) intervals, and the coordinates of the respective points are set as Nj (j=0 through N−1) (step S14).

N points (pixels) are selected from the M points Mi in the input range (step S15) and correspondences between the selected points and the N points in the output range are established to produce the first texture (step S16).

Then, a function F(X) to be obtained is expanded using Legendre polynomial in each of the (N−1) intervals (step S17), and linearly approximated using the zero degree and linear components in the Legendre polynomial (step S18).

The difference between the intercepts of the linear approximate values of an adjoining pair of the intervals on both sides of the point Nj is obtained (step S19), and it is judged whether the difference is a predetermined threshold value or larger (step S20). When the difference is the threshold value or larger, processes from the selection of N points in step S15 are repeated.

When it is determined that the difference is smaller than the threshold value, the GPU 6 sets the average of the intercepts of the linear approximate values of the adjoining pair of the intervals on both sides of the point Nj as a value Nj at the boundary point (step S21).

A texture constituted by the obtained value Nj and the point Nj is determined as the second texture (step S22).

Then, correspondence between the point Nj and an expansion coefficient for the pth term in the Legendre polynomial in the jth interval is established and determined as the (p−2)th third texture (step S23). This texture is the (p−2)th third texture because the zero degree and linear components are excluded.

Finally, correspondence between the point Nj and a function value at the point Nj in the p degree Legendre polynomial is established and determined as the (p−2)th fourth texture (step S24).

Second Embodiment

Next, a second embodiment according to the invention is described. In the following description, similar numbers are given to similar parts having been described above, and the same explanation is not repeated.

According to the GPU 6 in the first embodiment discussed above, for obtaining function values for the terms of the respective degrees in Legendre polynomial, the texture LINEAR reading means 65 refers to a texture stored in the fourth texture storing means 74 to produce function values.

Figure 13:
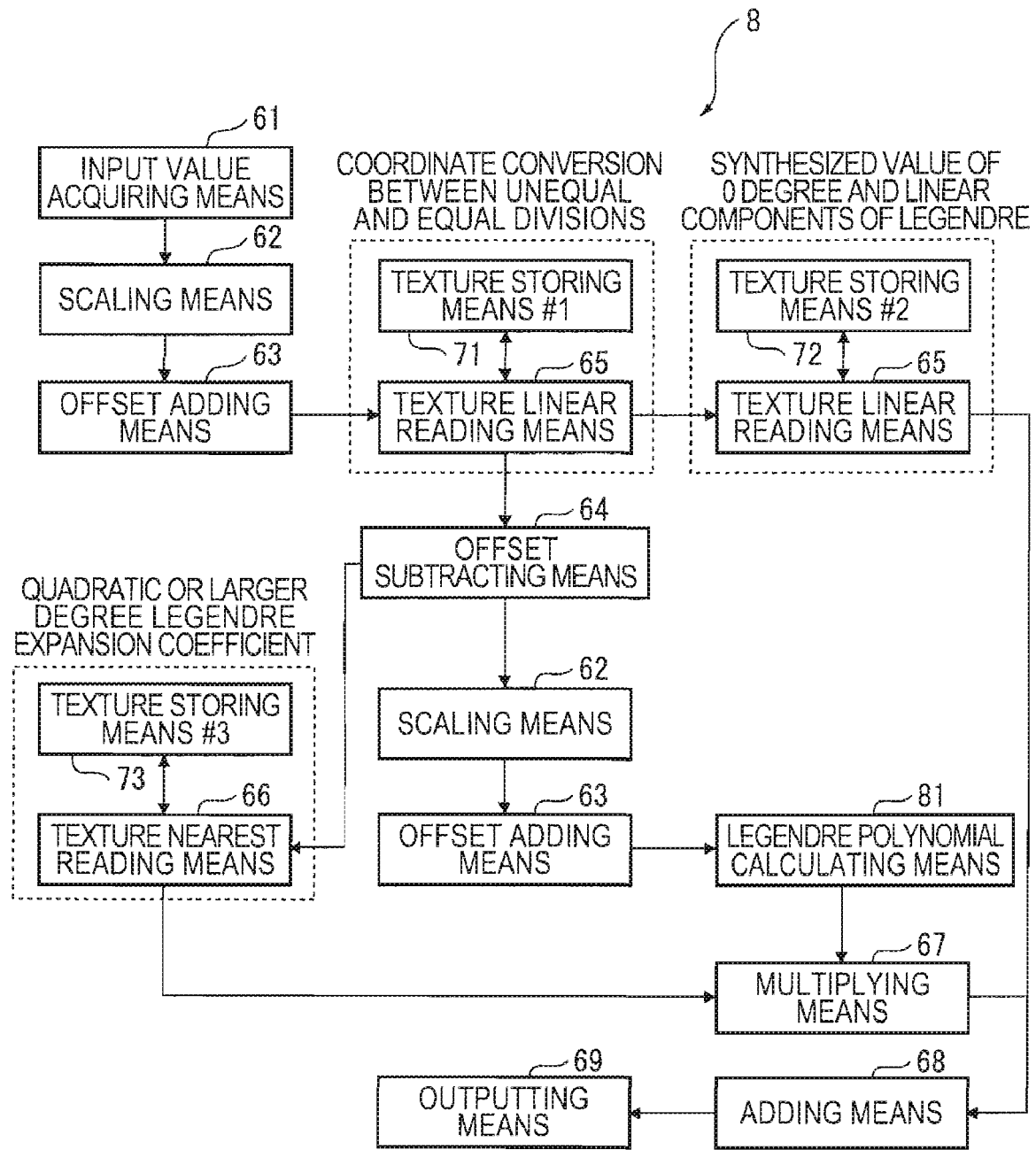
FIG. 13 is a block diagram showing a structure of a GPU in a second embodiment according to the invention.

Different from the GPU 6, a GPU 8 in the second embodiment uses Legendre polynomial calculating means 81 which directly calculates function values as illustrated in FIG. 13.

The respective terms constituting Legendre polynomial are quadratic function and cubic function. Thus, the general-purpose GPU 8 can easily execute calculations using the square and the cube of an input value.

Figure 14:
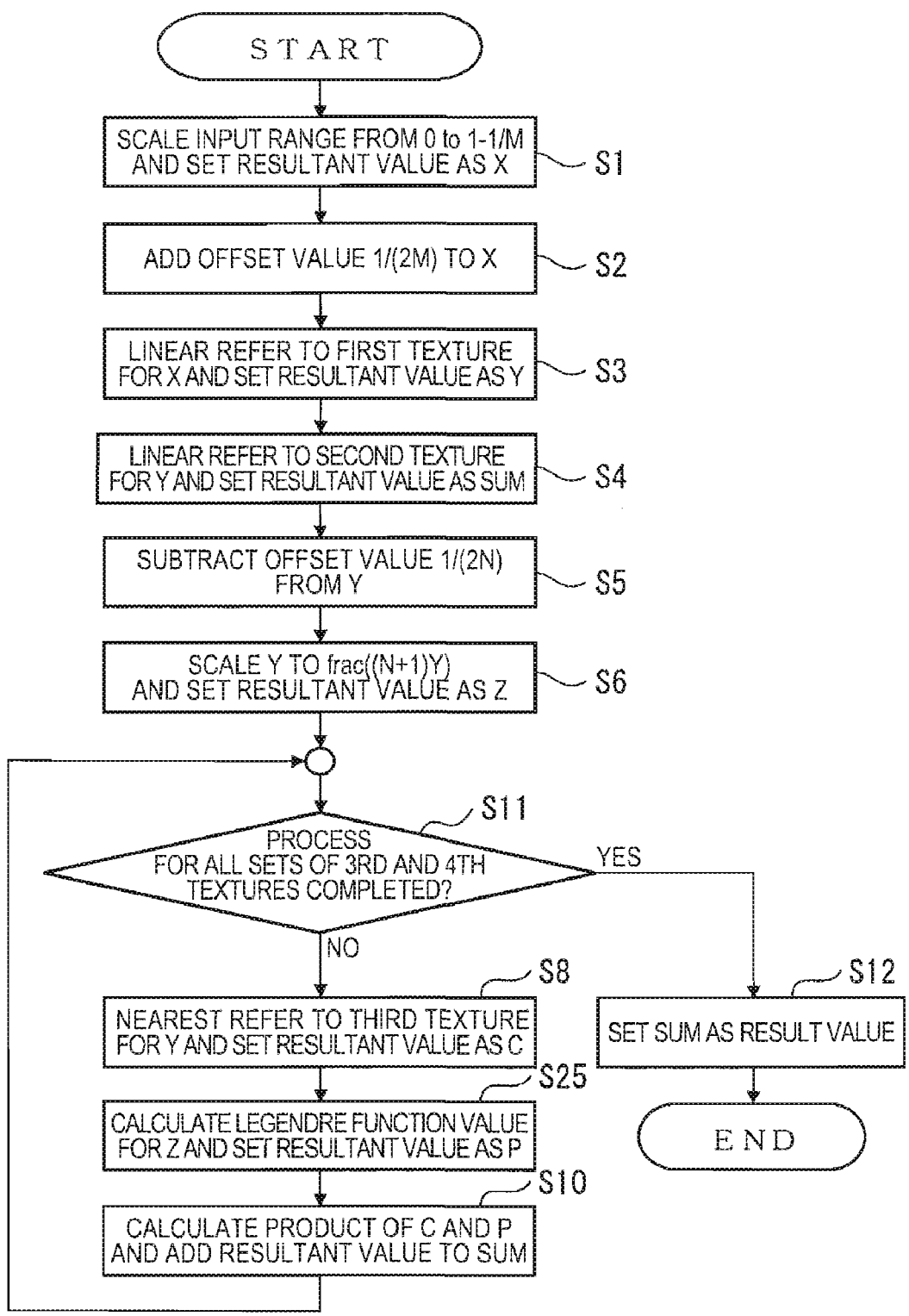
FIG. 14 is a flowchart showing an operation in the second embodiment.

As illustrated in FIG. 14, the operation of the GPU 8 is basically similar to the operation of the first embodiment in the processes from step S1 to step S8. However, the process in step S7 is eliminated and function values for the respective degrees are directly calculated based on the value Z as shown in step S25 at the time of calculation of the function values. Then, the calculated function values are determined as the values P.

In this structure, the function values can be directly obtained by calculation without decreasing the processing speed of the GPU 8. As a result, the accuracy is further increased.

MODIFIED EXAMPLES

It is not intended that this invention is limited to the particular embodiments described and depicted herein, but include all modifications and variations such as those shown below.

In the above embodiments, the data conversion method according to the invention is executed by using the GPU 6 contained in the projector 1. However, the data conversion method may be carried out by using a GPU contained in a general-purpose computer.

In the above embodiments, the data conversion method according to the invention is adopted for the conversion of input image data into image data appropriate for the liquid crystal panels 23. However, the data conversion method may be used for obtaining ordinary function values by a processor.

In the above embodiments, the function F(X) is expressed by Legendre polynomial. However, the function F(X) may be expressed by other orthogonal functions such as Fourier transform and DCT transform for performing the data conversion method according to the invention.

Other specific structures and procedures used for practicing the invention may be other structures or the like as long as the advantage of some aspects of the invention can be achieved.

The entire disclosure of Japanese Patent Application No. 2006-49734, filed Feb. 27, 2006 is expressly incorporated by reference herein.

What is claimed is:

1. A data conversion method for a processor which refers to textures for converting an input value inputted to the processor into an output value by using a predetermined function, the processor executing:

a first texture referring step for referring to a first texture and converting the input value into an unequal division value, the first texture being produced by dividing an input range by M pieces of data into (M−1) equal intervals and an output range by N pieces data into (N−1) equal intervals, where N is smaller than M, selecting N pieces of data in unequal division from the M pieces of data in the input range, and establishing correspondences between the selected N pieces of data and the N pieces of data in the output range;

a second texture referring step for referring to a second texture and producing a linearly approximated component of the unequal division value, the second texture being produced by interpolating function values for each of the (N−1) intervals using zero degree and linear components of an orthogonal function expressing the function;

a third texture referring step for referring to a third texture and producing an expansion coefficient corresponding to the unequal division value, the third texture being produced by interpolating texture groups having expansion coefficients of quadratic or larger degree components of the orthogonal function in each of the (N−1) intervals;

a function value producing step for producing a function value of a quadratic or larger degree component of the orthogonal function for the interval containing the unequal division value; and an adding step for calculating the product of the expansion coefficient produced by the third texture referring step and the function value produced by the function value producing step, and adding the obtained product to the linearly approximated component produced by the second texture referring step to obtain the output value.

2. The data conversion method for a processor according to claim 1, wherein the function value producing step refers to a fourth texture which stores function values of the orthogonal function in the respective texture groups to produce the function value.

3. The data conversion method for a processor according to claim 1, wherein the orthogonal function is Legendre polynomial.

4. A texture producing method for a processor for producing textures to which the processor refers for converting an input value into an output value by using a predetermined function, comprising the processor executing:

a first texture producing step for producing a first texture by dividing an input range by M pieces of data into (M−1) equal intervals and an output range by N pieces of data into (N−1) equal intervals, where N is smaller than M, selecting N pieces of data from the M pieces of data which divide the input range into the respective intervals, and establishing correspondences between the N pieces of data selected in the input range and the N pieces of data in the output range;

an orthogonal function expanding step for expanding each of the (N−1) intervals by using an orthogonal function expressing the function;

an interpolation texture calculating step for interpolating each of the (N−1) intervals by using zero and linear components in the orthogonal function and calculates an interpolation texture;

a boundary value calculating step for calculating boundary values of an adjoining pair of the intervals in the boundary area therebetween in the interpolation texture;

a threshold value judging step for judging whether the difference between the boundary values of the adjoining pair of the intervals in the boundary area therebetween is smaller than a predetermined threshold value based on the calculated boundary values;

a restarting step for repeating processes from the first texture producing step when it is judged that the difference is a predetermined threshold value or larger;

a boundary average calculating step for calculating the average of the boundary values of the adjoining pair of the intervals in the boundary area therebetween when it is judged that the difference is smaller than the predetermined threshold value;

a second texture producing step for producing a second texture by substituting the average calculated by the boundary average calculating step for the boundary values of the respective intervals in the interpolation texture;

a third texture producing step for producing a third texture by establishing the correspondences between the respective intervals in the interpolation texture and quadratic and larger degree expansion coefficients in the orthogonal function; and a fourth texture producing step for producing a fourth texture by establishing the correspondences between the respective intervals in the interpolation texture and function values of quadratic and larger degree components in the orthogonal function.

5. A projector, comprising:

a light modulation element for modulating lights emitted from a light source in accordance with image information;

a projection optical system for enlarging and projecting the lights modulated by the light modulation element; and an image processing device for processing the image information, wherein:

the image processing device has a processor and a storing device; and the storing device has (1) a first texture produced by dividing an input range by M pieces of data into (M−1) equal intervals and an output range by N pieces data into (N−1) equal intervals, where N is smaller than M, selecting N pieces of data in unequal division from the M pieces of data in the input range, and establishing correspondences between the selected N pieces of data and the N pieces of data in the output range, (2) a second texture produced by interpolating function values in each of the (N−1) intervals using zero degree and linear components of an orthogonal function which approximates the function and (3) a third texture produced by interpolating texture groups having expansion coefficients of quadratic or larger degree components of the orthogonal function in each of the (N−1) intervals.

* * * * *